United States Patent
Brahmadesam et al.

(10) Patent No.: US 11,561,864 B1
(45) Date of Patent: Jan. 24, 2023

(54) CREATING DATABASE CLONES AT A SPECIFIED POINT-IN-TIME

(71) Applicant: Amazon Technologies, Inc., Seattle, WA (US)

(72) Inventors: Murali Brahmadesam, Bengaluru (IN); Changan Han, Kirkland, WA (US); Raman Mittal, Seattle, WA (US); Seungmin Wei, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 16/831,651

(22) Filed: Mar. 26, 2020

(51) Int. Cl.
  G06F 16/17   (2019.01)
  G06F 16/182  (2019.01)
  G06F 16/27   (2019.01)
  G06F 11/14   (2006.01)

(52) U.S. Cl.
  CPC ...... *G06F 11/1464* (2013.01); *G06F 11/1451* (2013.01); *G06F 11/1469* (2013.01); *G06F 11/1471* (2013.01); *G06F 16/1734* (2019.01); *G06F 16/1844* (2019.01); *G06F 16/27* (2019.01); *G06F 2201/80* (2013.01); *G06F 2201/84* (2013.01)

(58) Field of Classification Search
  CPC .......... G06F 11/1464; G06F 11/1451; G06F 11/1469; G06F 11/1471; G06F 16/1734; G06F 16/1844; G06F 16/27; G06F 2201/80; G06F 2201/84
  USPC .......................................................... 707/644
  See application file for complete search history.

(56) References Cited

U.S. PATENT DOCUMENTS

| | | | |
|---|---|---|---|
| 7,334,094 B2 | 2/2008 | Fair | |
| 7,590,660 B1 * | 9/2009 | Richards | ................. G06F 16/10 707/999.102 |
| 8,612,396 B1 * | 12/2013 | McAlister | ........... G06F 11/1469 707/674 |
| 8,832,028 B2 | 9/2014 | Susairaj et al. | |
| 8,924,357 B2 | 12/2014 | Zane et al. | |
| 9,251,003 B1 | 2/2016 | Gupta et al. | |
| 9,280,591 B1 | 3/2016 | Kharatishvili et al. | |
| 9,424,140 B1 | 8/2016 | Madhavarapu et al. | |
| 9,507,843 B1 | 11/2016 | Madhavarapu et al. | |
| 9,542,456 B1 | 1/2017 | Das et al. | |
| 10,108,496 B2 | 10/2018 | Hoobler, III et al. | |
| 10,216,949 B1 | 2/2019 | McKelvie et al. | |
| 2009/0307286 A1 * | 12/2009 | Laffin | ................. G06F 11/1451 |
| 2010/0198920 A1 | 8/2010 | Wong et al. | |
| 2012/0089764 A1 | 4/2012 | Baskakov et al. | |
| 2013/0311441 A1 | 11/2013 | Erdogan et al. | |
| 2014/0279900 A1 | 9/2014 | Gupta et al. | |

(Continued)

OTHER PUBLICATIONS

U.S. Appl. No. 15/488,329, filed Apr. 14, 2017, Murali Brahmadesam, et al., only documents filed upto Apr. 11, 2022.

*Primary Examiner* — Michael Pham
(74) *Attorney, Agent, or Firm* — S. Scott Foster; Kowert, Hood, Munyon, Rankin & Goetzel, P.C.

(57) ABSTRACT

A point-in-time clone may be created for a database. A request to create the point-in-time clone may be received. The clone may be provided with access to a storage for the database that stores a history of modifications to the database applicable to return data of the database according to a state of the data at the specified point in time. The clone may then be updated so that the updates made to the clone are stored for subsequent access by the clone.

20 Claims, 9 Drawing Sheets

(56) References Cited

U.S. PATENT DOCUMENTS

| | | |
|---|---|---|
| 2014/0279929 A1 | 9/2014 | Gupta et al. |
| 2014/0279930 A1 | 9/2014 | Gupta et al. |
| 2014/0324785 A1 | 10/2014 | Gupta et al. |
| 2015/0019495 A1 | 1/2015 | Siden et al. |
| 2017/0032005 A1 | 2/2017 | Zheng et al. |
| 2017/0242871 A1 | 8/2017 | Kilaru et al. |
| 2017/0270175 A1 | 9/2017 | Bantupalli et al. |

* cited by examiner

CREATING DATABASE CLONES AT A SPECIFIED POINT-IN-TIME

BACKGROUND

Database systems support various kinds of systems, services, and applications. Determining how to utilize a database can involve testing, development, or other techniques that may benefit from using a copy of an existing database. Therefore, a database clone may be created from an existing database to provide the copy for testing, development, or other techniques or systems that may use the copy of the database.

Figure 1:
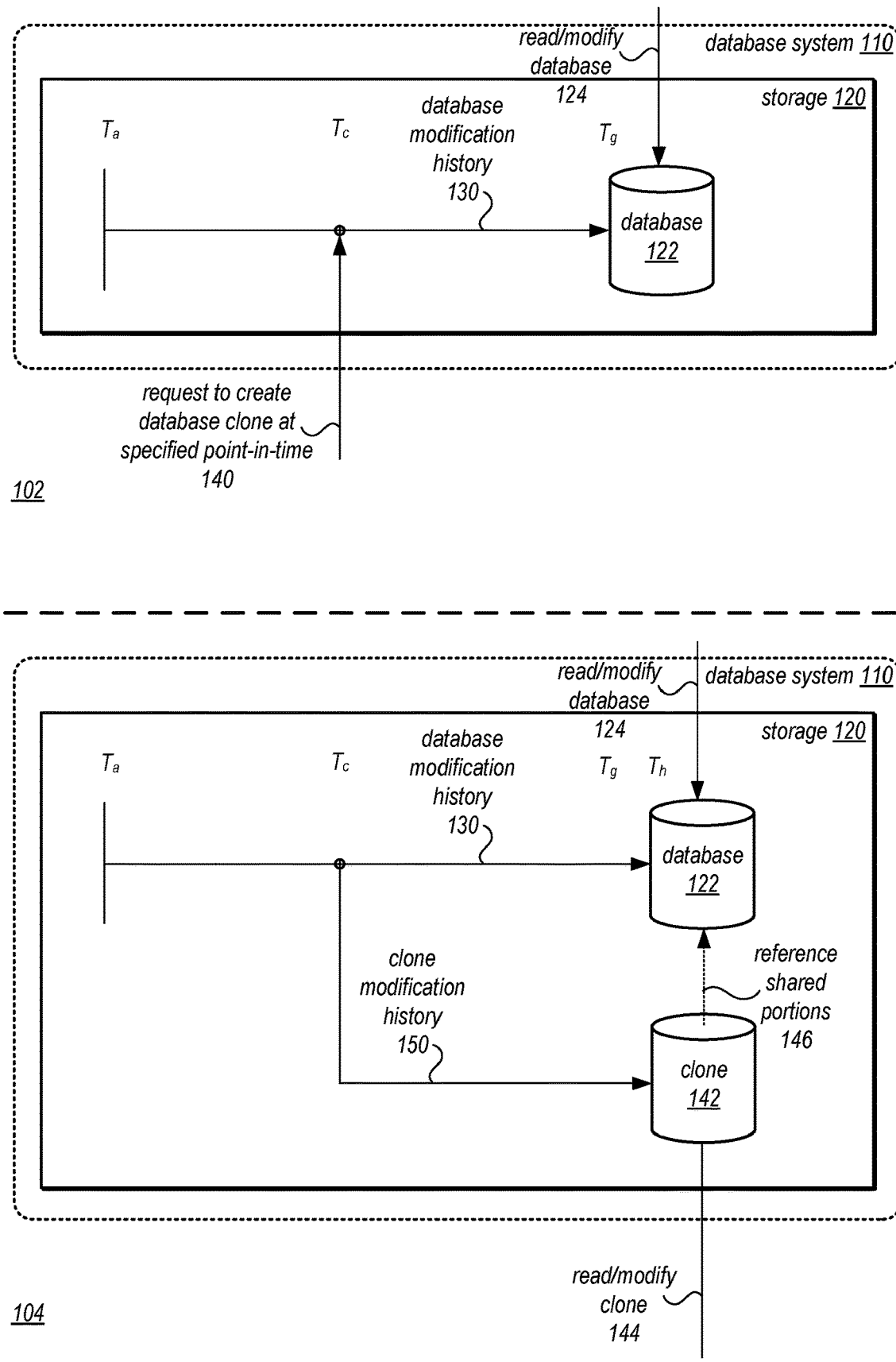
FIG. 1 is a logical block diagram illustrating creating a database clone at a specified point-in-time, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for creating a database clone at a specified point-in-time are described herein. Because database systems support various kinds of systems, services, or applications, database clones can be utilized in scenarios where it is useful to perform various testing, modifications, alternative deployment configurations, or switching to alternative versions of a database, in order to provide a copy of a database that can be updated or used without affecting the source database from which the clone is made, in various embodiments. Moreover, the ability to utilize a database clone as of a specified point-in-time may offer further opportunities in these types of scenarios as the state of a database at a specified point-in-time may provide further insights to developers. Unlike cloning techniques that create an entirely new copy to clone a database, techniques for creating a database clone at a specified point-in-time can leverage a recorded history of modifications to quickly provide access to a database clone at the specified point-in-time without recreating an entirely new copy of the entire database. In this way, database clones can be quickly created and used without relying upon the time and resource costs it takes to create a complete database clone. Moreover, the existing database can continue to accept requests that update the source database, preventing disruption to existing systems, applications, or services that rely upon the source database.

FIG. 1 is a logical block diagram illustrating creating a database clone at a specified point-in-time, according to some embodiments. As illustrated in scene 102, database system 110 may utilize a common storage 120 to provide access to a database 122. Database 122 may be various kinds of database, such as relational, non-relational, document, graph, time series, or other type of database for which a clone may be created. A database modification history 130 may be recorded (e.g., as discussed in the example logs in FIG. 5) so that the various states of a the database from Time $T_a$ to time $T_g$ can be recreated. A request to create a database clone at a specified point-in-time, such as time $T_c$ may be received, even though the current state of database 122 is at time $T_g$ and is continuing to accept various read or modify requests 124.

As depicted in scene 104, the same storage 120 may be used to store clone 142 and clone modification history 150. In this way, clone 142 may provide an alternative history separate from database 122 (e.g., for the various clone purposes discussed above, including alternative values for items in the database, removal or deletion of items present in the source database, and/or insertion or inclusion of items not present in the source database). As discussed below with regard to FIGS. 5-8, clone 142 may reference or otherwise share portions 146 of database 122 (e.g., reference some pages) in order to be quickly available to a client when requested. Read/modify requests 144 to clone 142 can utilize clone 142 to access the version of the database at the specified point-in-time, as well as any subsequently made changes at the clone.

Please note, FIG. 1 is provided as a logical illustration of database systems, storage, databases, clones, or modification history and is not intended to be limiting as to the physical arrangement, size, or number of components, modules, or devices to implement such features.

The specification first describes an example network-based database service that performs creating a database clone at a specified point-in-time. Included in the description of the example network-based database service are various aspects of the example network-based database service, such as a database engine head node, and a separate storage service. The specification then describes flowcharts of various embodiments of methods for creating a database clone at a specified point-in-time. Next, the specification describes an example system that may implement the disclosed techniques. Various examples are provided throughout the specification.

Figure 2:
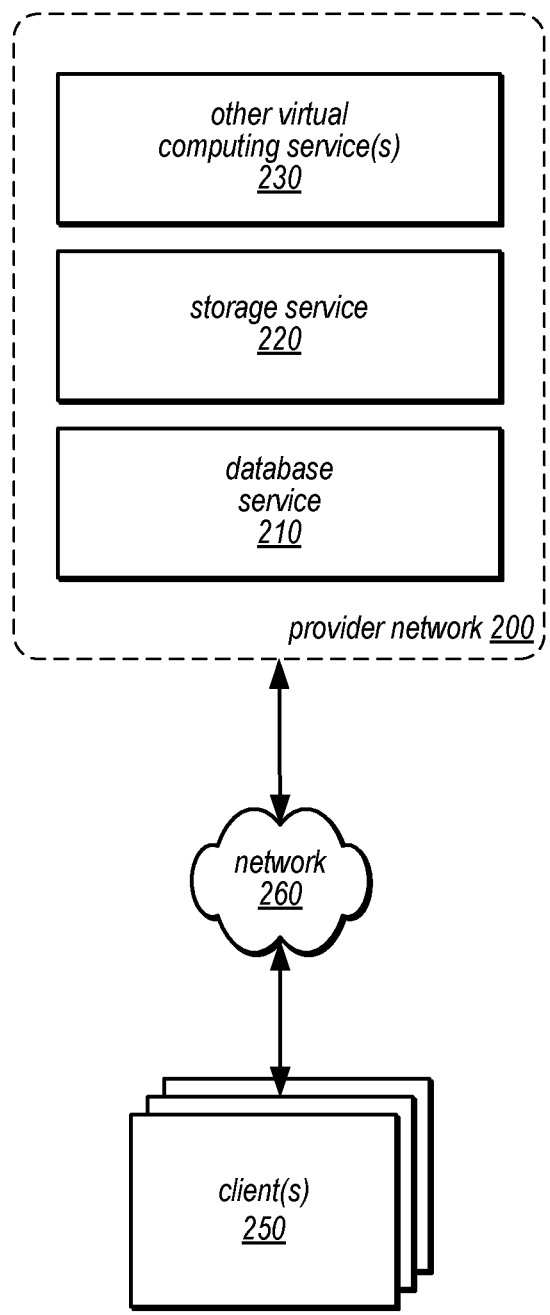
FIG. 2 is a block diagram illustrating a provider network that may implement a database service that implements creating a database clone at a specified point-in-time to mirrored databases, according to some embodiments.

FIG. 2 is a block diagram illustrating a provider network that may implement a database service that implements creating a database clone at a specified point-in-time, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200.

In the illustrated embodiment, a number of clients (shown as clients 250 may interact with a provider network 200 via a network 260. Provider network 200 may implement respective instantiations of the same (or different) services, a database services 210, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
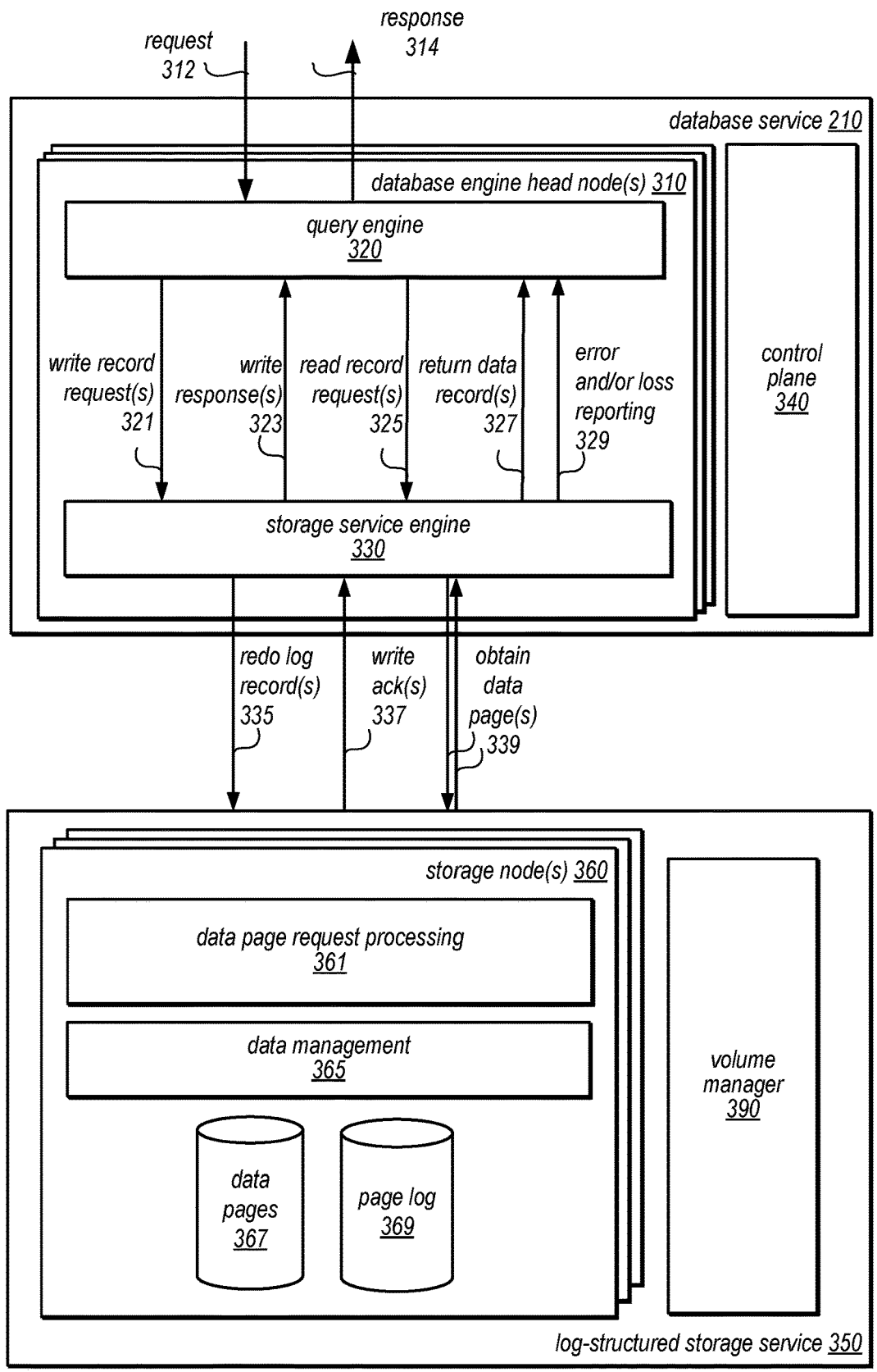
FIG. 3 is a block diagram illustrating various components of a database service and storage service that provides access to a database or clone of the database, according to some embodiments.

FIG. 3 is a block diagram illustrating various components of a database service and storage service that provides access to a database or clone of the database, according to some embodiments. Database service 210 may implement control plane 340 which may manage the creation, provisioning, deletion, or other features of managing a database hosted in database service 210. For example, as discussed below with regard to FIG. 4, control plane 340 may create a clone of a database in response to a request, in some embodiments.

Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314.

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 335-3339 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of)

various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 335-339) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, as discussed in detail with regard to FIGS. 4 and 5, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
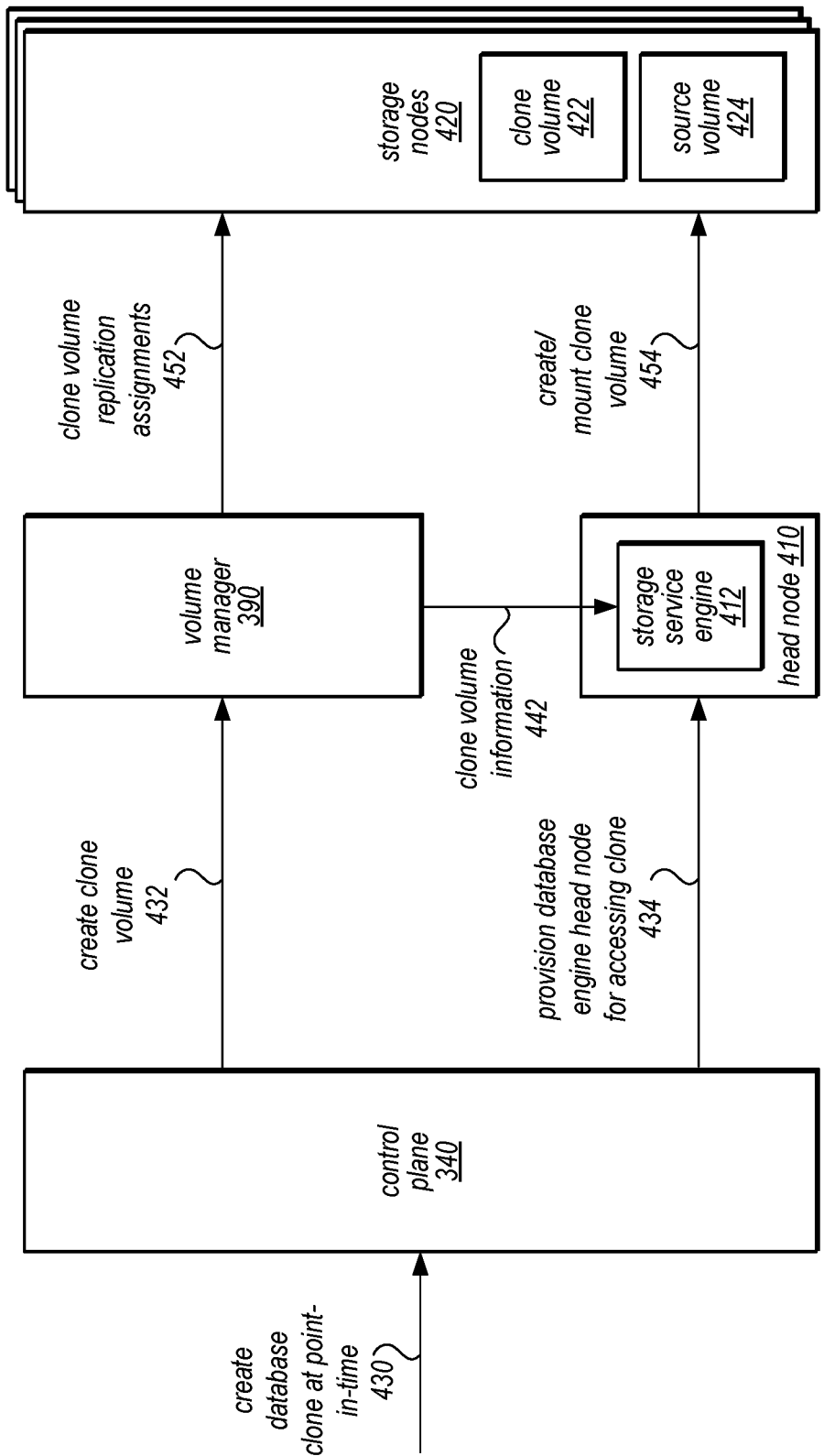
FIG. 4 is a block diagram illustrating creation of clone of a database at a specified point-in-time, according to some embodiments.

FIG. 4 is a block diagram illustrating creation of clone of a database at a specified point-in-time, according to some embodiments. A request 430 to create at database at a specified point-in-time may be received at control plane 340 (e.g., via an admin interface or console). Control plane 340 may request 432 volume manager 390 to create a clone volume for the database as of the specified point-in-time, in some embodiments. Control plane 340 may also provision a database engine head node 434 for accessing the clone, such as head node 410. For example, additional pre-configured database engine head nodes not assigned to any database may be organized as a pool of available head nodes, which may be individually assigned to a database (or clone of a database) when control plane 340 provisions that database engine head node. As discussed with database engine head nodes in FIG. 3, head node 410 may include storage service engine 412 for interacting with the data of the database (e.g., in clone volume 422 and source volume 424) at storage nodes 420 for the database.

Volume manager 390 may create the various management and control information for the new clone volume (e.g., identifiers, storage node assignments, replication policies or protocols, etc.) and communication the clone volume information to storage service engine 412. In some embodiments, clone volume 422 may be referred to as a snapshot of source volume 424 that incorporates the management and control information as well as references to pages or other portions of data that are shared with source volume 424. In this way, the snapshot does not have to create copies of identical data when the clone volume 422 is created, but instead may point to which portions of data can be used from source volume. Volume manager 390 may also make clone volume replication assignments 452 so that, for instance, storage nodes 420 may be able to replicate received changes to other storage nodes in a protection group for the clone volume, in some embodiments.

As indicated at 454, storage service engine 412 may send one or more requests to create and/or mount clone volume 422 at storage nodes 420. The create/mount request 454 may use some of the clone volume information (e.g., volume identifier, storage node assignments, etc.). In some embodiments storage service engine 412 may ask for information determined from the log for the source volume 424 (e.g., such as the log discussed below with regard to FIG. 5) to indicate an LSN value or range of LSN values associated with the clone volume to use when requesting data pages from or writes to clone volume 422 (e.g., according to the interactions discussed above with regard to FIG. 3).

Figure 5:
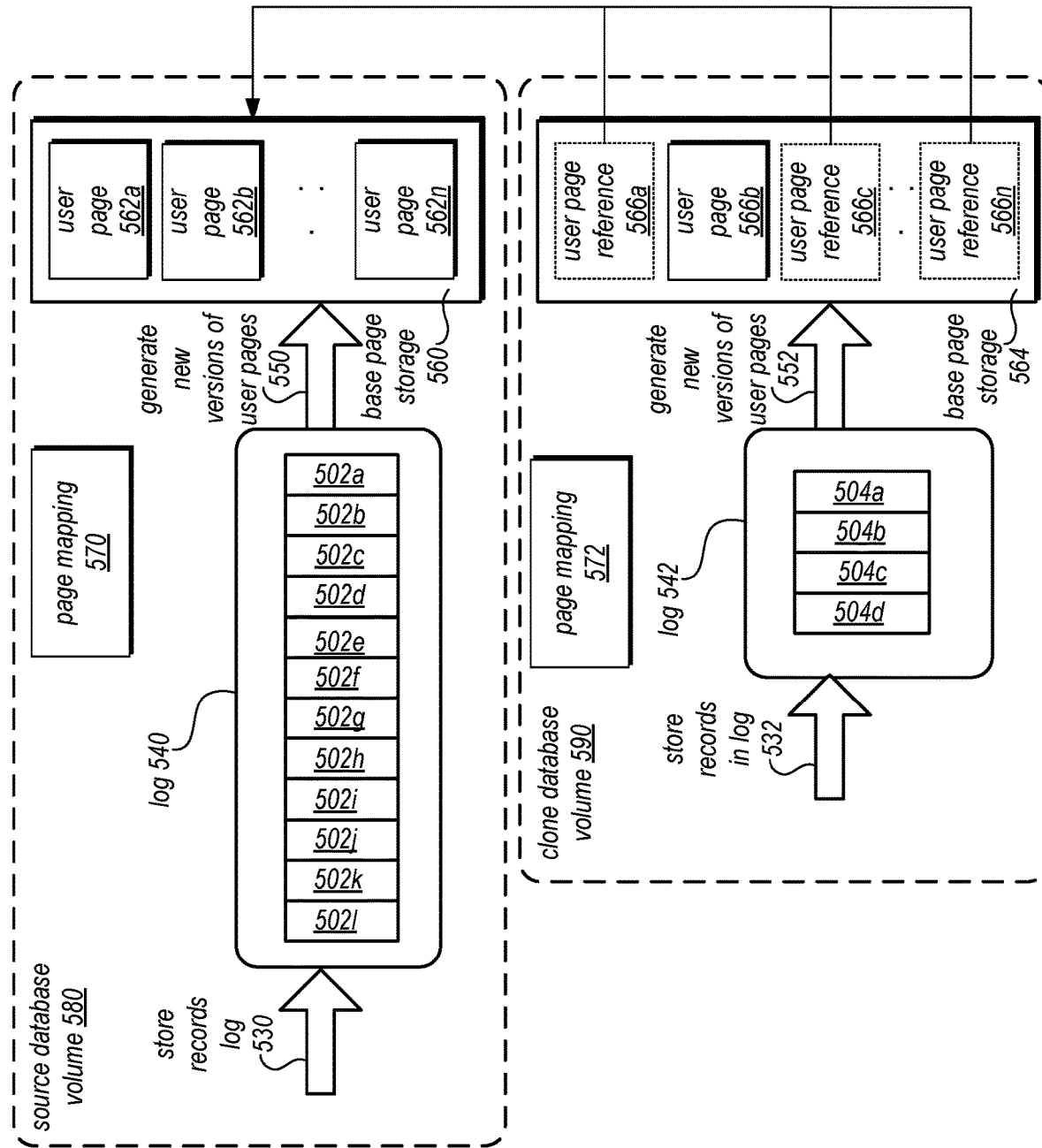
FIG. 5 is a logical block diagram illustrating a source database volume and clone database volume, according to some embodiments.

FIG. 5 is a logical block diagram illustrating a source database volume and clone database volume, according to some embodiments. In some embodiments, a database volume (or portion of a database volume, such as a segment of a database volume), such as source database volume 580, may include a log 540 to accept new writes from the client as they are received by the storage node. For example, writes may be received from a client as Delta User Log Records (DULRs), which specify a change to a user/data page in the form of a delta from the previous version of the page, and Absolute User Log Records (AULRs), which specify the contents of a complete user/data page, may be written completely into the log. Log records may be added to this log in approximately the order they are received (e.g., they are not sorted by LSN) and they can span across log pages. The log records may be self-describing, e.g., they may contain an indication of their own size. In some embodiments, a buffer region (e.g., a hot log region) may store received log records until they can be stored in order according to LSN in log 540.

In some embodiments, the storage systems described herein may maintain various data structures, such as page mapping 570, in memory. For example, for each user page present in a database volume, a user page table may store a bit indicating whether or not this user page is "cleared" (i.e., whether it includes all zeroes), the LSN of the latest log record from the cold log zone for the page, and an array/list of locations of all log records from the log 540 for a page. For each log record, the user page table may store the sector number, the offset of the log record within that sector, the number of sectors to read within that log page, the sector number of a second log page (if the log record spans log pages), and the number of sectors to read within that log page.

In some embodiments of the storage systems described herein, an LSN index may be stored in memory. An LSN index may map LSNs to log pages within the log. Given that log records in log 540 may be sorted, in some embodiments, it may be enough to include one entry per log page. However, in some embodiments, every non-obsolete LSN may be stored in the index and mapped to the corresponding sector numbers, offsets, and numbers of sectors for each log record.

In some embodiments of the storage systems described herein, a log page table may be stored in memory, and the log page table may be used during garbage collection of the log 540. For example, the log page table may identify which log records are obsolete (e.g., which log records can be garbage collected) and how much free space is available on each log page. As discussed below with regard to FIG. 8, log records may be retained for a clone volume, in some embodiments, and the log page table may be updated to preserve log records for a clone volume, in some embodiments.

Source database volume 580 may be stored for a database that is the source of a clone. As noted above log records received at a storage node may, in some embodiments, be first stored in a temporary or persistent buffer, such as a hot log zone (not illustrated). Log records may be received out of order, appended to the hot log zone as they are received. Log records sent to a storage system, such as described above in FIG. 5, may be sent asynchronously, leading to log records received out of order at a hot log zone.

As discussed above, log records may be moved from the hot log zone to store the log records 530 in the log 540. The log 540 may be populated by copying log records from the hot log zone, in some embodiments (although in other embodiments the log records may be stored directly to log 540 without a hot log zone). In some embodiments, only log records whose LSN is less than or equal to some threshold LSN value may be eligible to be copied to the log. When moving log records from the hot log zone to the log 540, some log records (such as many change log records) may not need to be copied because they are no longer necessary. In addition, some additional coalescing of log records to generate new versions 550 of user pages 562 may be performed at this point (e.g., either to overwrite or store a new version of a user page in a separate). For example, if user page is not shared or otherwise referenced with any other copies of the database volume, such as clone database volume 590, then the user page may be overwritten in base page storage 560. In some embodiments, log records stored in data blocks grouped together in log pages. In some embodiments, once a given hot zone page or data block has been completely written to log 540 and is no longer the newest hot zone data block, and all log records on the hot zone data block have been successfully copied to the log, the hot zone data block may be freed and reused.

Log 540 may, in various embodiments, maintain log records for a log-structured data store, such as log records 502a, 502b, 502c, 502d, 502e, 502f, 502g, 502h, 502i, 502j, 502k, and 502l respectively. The log records, of which many various descriptions presented above, may be AULRs, DULRs, or any other type of log record for the example storage system described above, or any other log-structured data store. These log records may be linked to or associated with a user page 562. For example, a log record may describe an update/change/modification for some portion, or all, of the user page, such as change relative to a previous record or version of the data page (e.g., a DULR). In some embodiments, log records may be stored sequentially in data blocks or pages. Thus, the latest LSN in the ordering of log records maintained in a data block may indicate that all log records in the log page are prior to the latest LSN. In some embodiments, the range of changes described by log 540 may be the history window for creating a clone at a specified point-in-time.

Base page storage 560, may maintain entries or versions of user pages 562a, 562b through 562n. For example, each entry in base page storage 560 may maintain a replica or copy of the respective user page. In some embodiments, each entry may be compressed, encrypted, or otherwise encoded. Other data, such as other log records linked to the data page, may also be stored with the data page in the entry for the data page in backstop 560. Page mapping 570 may identify the locations of user pages, so that when a request to access a user page 562 is received (e.g., in order to read a user page 562), page mapping 570 can be used to access the page.

Clone database volume 590 may be stored at the same storage node, and in at least some embodiments, on the same storage device as the volume (or segment(s)) with which it shares or otherwise references data pages (e.g., multiple copies, such as a source and multiple different clones, of a database volume may be stored together). Once a clone of a database is created, the various numbers of ranges and extents may be created as segment copies (e.g., in protection groups). As illustrated in FIG. 5, a clone database volume 590 may store data for use in a manner similar to source database volume 580, including storing 532 received log records for the copy of the database (and may include using a hot log portion) in log 542, and then generating new versions of user pages 552. Clone database volume 590 may include page mapping information 572 which may identify pages in base page storage 564 or reference pages in another base page storage, such as base page storage 560. As clone database volume 590 may share some data pages with source database volume 580, base page storage 564 may have reference user pages, such as reference user pages 566a, 566c, and 566n, which may be a pointer to a corresponding user page that can be used to generate the state of the page at the specified point-in-time for the clone, while maintaining a smaller number of stored user pages, such as user page 566b. Instead, these user page references may be replaced when updates to the clone database volume 590 are performed, as discussed below with regard to FIG. 8, in some embodiments.

Figure 6:
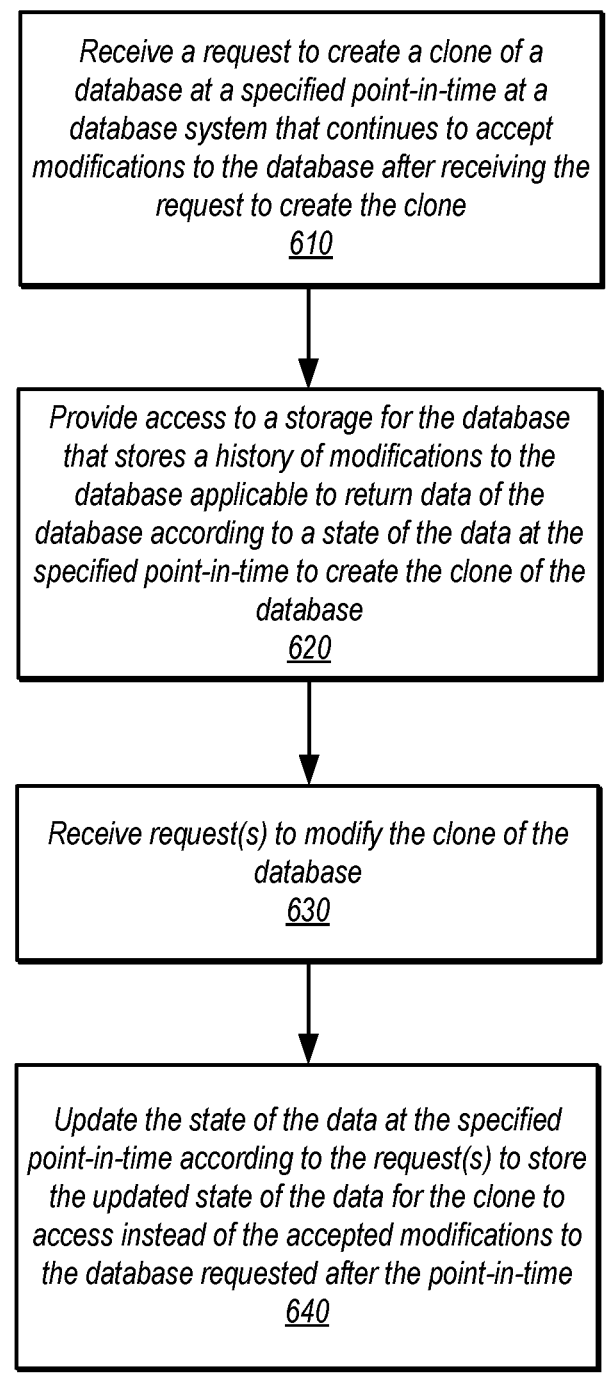
FIG. 6 is a high-level flowchart illustrating various methods and techniques to implement creating a database clone at a specified point-in-time, according to some embodiments.

The database service and storage service discussed in FIGS. 2 through 5 provide examples of a system that may implement creating a database clone at a specified point-in-time. However, various other types of data stores (e.g., non-log structured) or other database systems may implement creating a database clone at a specified point-in-time. FIG. 6 is a high-level flowchart illustrating various methods and techniques to implement creating a database clone at a specified point-in-time, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 610, a request to create a clone of a database at a specified point-in-time at a database system may be received, in some embodiments. The request to create the clone may be received via a programmatic interface (e.g., an API request), command-line interface, and/or graphical user interface (GUI). The request may be received at a database management system, database engine, query engine, database engine node or other component that also handles access requests (e.g., queries or updates to the database). In some embodiments, the request may be directed to and/or received at a management console or other control plane interface separate from database access requests. The point-in-time may be specified according to a time value, in some embodiments, such as a specific date-time, or may be specified as an interval or other value that can be used to determine the point-in-time (e.g., a clone of the database 24 hours ago). As indicated at 610, the database system may continue to accept modifications to the database after receiving the request to create the clone. In this way, the database may provide both a source version and a cloned version of the database with alternative histories starting from the specified point-in-time, as illustrated and discussed above with regard to FIG. 1.

As indicated at 620, access to a storage for the database that stores a history of modifications to the database applicable to return data of the database according to a state of the data at the specified point in time may be provided to create the clone, in various embodiments. For example, as discussed above with regard to FIG. 5 and below with regard to FIG. 7, a log of modifications may be stored that is applicable to pages of a database (which may be of a state older, or equivalent to, the state of the specified point in time). The log of modifications may record the changes to the database that were accepted and performed up to a current version of the database, in some embodiments, which may allow for any version from any point-in-time for the database to be created that is included within the log of modifications, in some embodiments. Thus, for instance an access request to the clone can cause the portion to be accessed to be created on-demand, in response to that access request (instead of having that page be created at the time the request to create the clone is received). A clone, therefore, may be a logical clone that can be identified in a request (or be assigned to a separate query engine as discussed above), allowing for subsequent requests that modify the clone to create copies of different portions of the database. As discussed below with regard to FIG. 7, creation of a clone may include generating metadata or other information that prevents the information (e.g., the history) needed to create data for the clone when subsequent access requests are received from being deleted, purged, or otherwise removed. In some embodiments, the storage may generate pages or other portions of database data at the state of the specified point in time and return those pages or portions of data fore the clone to access. In some embodiments, other techniques may be performed (e.g., storing undo records to undo changes in order to reach the specified-point-in-time).

As indicated at 630, request(s) to modify the clone of the database may be received, in some embodiments. For example, the requests may add, remove, insert, change, append, delete, or otherwise modify database data, including modifications to database schema (e.g., number of table columns) or other database features. The requests may be received at a separate database engine for the clone or may be received at the same database engine that handles requests to the source database, which may also handle access requests to the clone, in some embodiments.

As indicated at 640, the state of the data at the specified point-in-time may be updated according to the requests(s), in some embodiments. For instance, the updated state of the data may be stored for the clone to access instead of the accepted modifications to the database requested after the point-in-time. The storage of the database may, for example, return subsequent access requests for the clone (e.g., requests to read or modify) using the updated data (e.g., the new page created for the clone instead the page/log records that were previously referenced by the clone).

The techniques described above with regard to FIG. 6, as well as below with regard to FIGS. 7 and 8, can be performed to create multiple different clones for a same database, in some embodiments, one or more of which may be at different specified points-in-time. The clones may also be deleted in response to a request, which may only delete the data for the clone and not, for instance, pages referenced in a source database volume to create the clone. In some embodiments, a source database may be deleted in response to a request without deleting those portions of a source database volume shared with a clone database volume. In some embodiments, a clone of a clone can be created using similar techniques. As some database systems may be distributed across multiple storage locations (e.g., across multiple shards), the described techniques can be implemented to quickly provide access to a clone of a large database that utilizes a large numbers of shards (as opposed to costly restore operations that create entire new copies of each shard).

Figure 7:
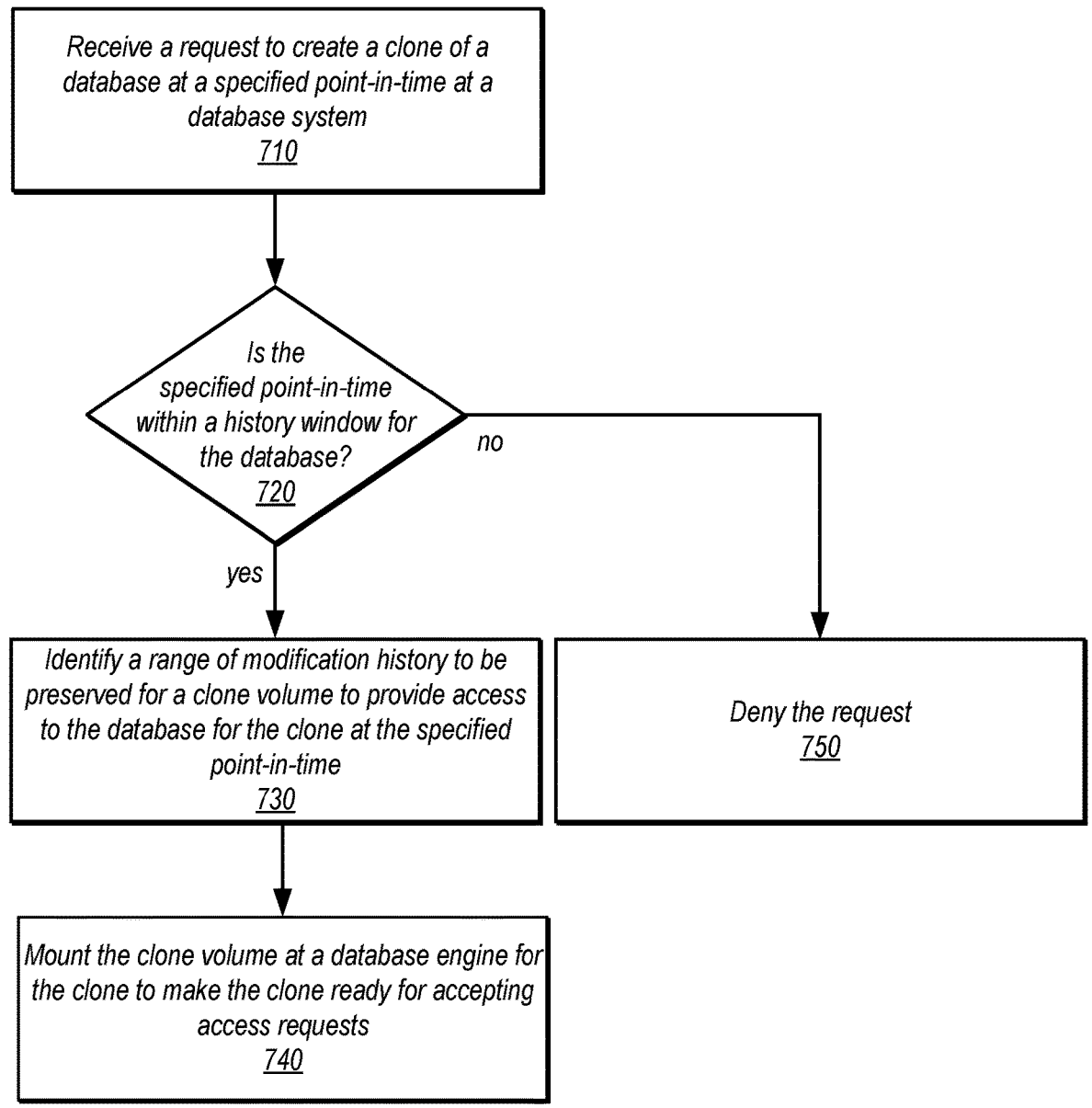
FIG. 7 is a high-level flowchart illustrating various methods and techniques to obtain a clone volume for a clone at a specified point-in-time, according to some embodiments.

FIG. 7 is a high-level flowchart illustrating various methods and techniques to obtain a clone volume for a clone at a specified point-in-time, according to some embodiments. As indicated at 710, a request to create a clone of a database at specified point-in-time at a database system may be received, in various embodiments (similar to the discussion above with regard to FIG. 6). In some embodiments, various checks may be performed to determine whether the creation request is valid. For example, one such check is indicated at 720, which determine whether the specified point-in-time is within a history window for the database, in some embodiments. The history of modifications maintained for a database may be limited, in some embodiments, in order to reduce the storage costs of maintaining a database volume. Therefore, a specified point-in-time that is not within the range of time described by the history window (e.g., previous 7 hours log of modifications), then the clone of the specified point-in-time cannot be created (or cannot be quickly created without accessing archived storage of the log), in some embodiments. If the specified point in time is not within the history window, then as indicated at 750, the request may be denied. Other checks may be performed in addition to or instead of the history window check. For example, there may be a limit on the number of clones at a specified point-in-time that can be created for a database (e.g., 10 or less). A request to create a clone over the limit, may result in a similar denial.

As indicated at 730, a range of modification may be identified to be preserved for a clone volume for the clone of the database in order to provide access to the database at the specified point in time, in some embodiments. For example, markers, metadata, or other configuration information may be updated to indicate that the range history may need to be preserved (instead of being flushed, expunged, or otherwise removed) in order to create the state of the data for the clone when needed (e.g., on the fly when an update is performed or a read requested—instead of creating an entire new copy of all contents of the database), such as discussed below with regard to FIG. 8.

As indicated at 740, the clone volume may then be mounted at a database engine for the clone to make the clone ready for accepting access requests, in some embodiments. An identifier for a clone volume may be provided to a storage engine or driver, such as storage service engine 330 in FIG. 3, to be able to identify and direct requests to particular data pages to read or redo log records for the data pages to send. As noted in FIG. 5, the clone volume may include a page mapping for identifying between referenced data pages from the source database (e.g., via pointers to data pages) as well as mapping information to data pages that have been subsequently created for the clone volume, as discussed below with regard to FIG. 8. Some (or all) of this mapping information may be shared with the database engine as part of mounting the clone volume, in some embodiments.

Figure 8:
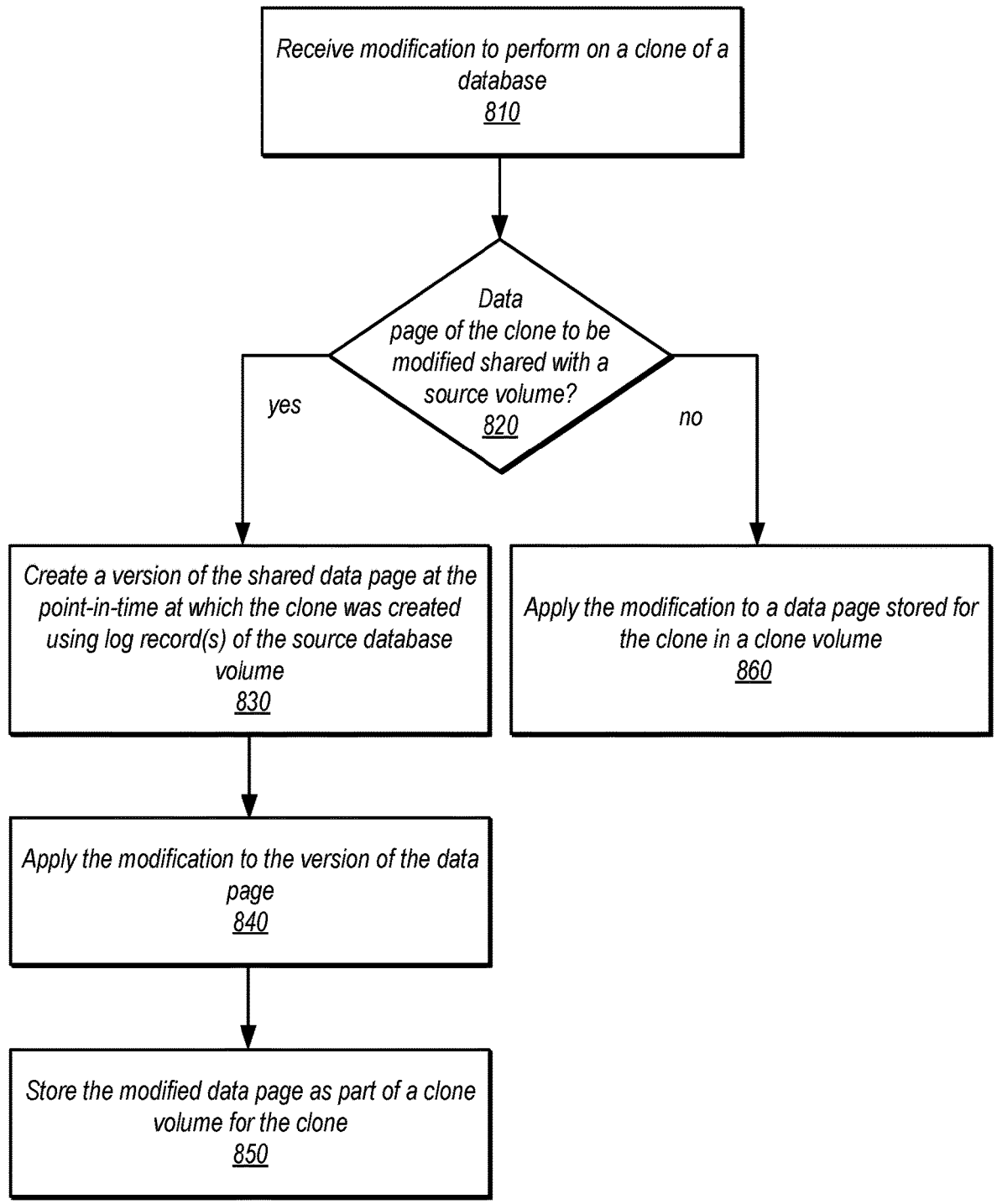
FIG. 8 is a high-level flowchart illustrating various methods and techniques to implement performing updates to a clone of a database specified at a point-in-time, according to some embodiments.

FIG. 8 is a high-level flowchart illustrating various methods and techniques to implement performing updates to a clone of a database specified at a point-in-time, according to some embodiments. As indicated at 810, a modification may be received to perform on a clone of a database, in some embodiments. A modification may include various requests to add, remove, change, update, insert, append, or any other alteration to the content, organization, or other feature of the database (e.g., change table name, etc.). The requests may be received at the same database engine that can access the source database, or may be received at a separately provisioned database engine, in some embodiments.

As indicated at 820, a determination may be made as to whether a data page of the clone to be modified is shared with a source volume, in some embodiments. For example, a page mapping may indicate whether the page to make the modification to references the source database volume or a clone database volume. If shared, then as indicated at 830, a version of a data page of the clone may be created for the point-in-time at which the clone was created from the shared data page and one or more log record(s) of the source database volume, in some embodiments. As indicated at 840, the modification may be applied to the version of the page, in some embodiments. As indicated at 850, the modified data page may be stored as part of a clone volume for the clone. If the data page to be modified is not shared, then as indicated at 860, the modification may be applied to a data page stored for the clone in the clone volume, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
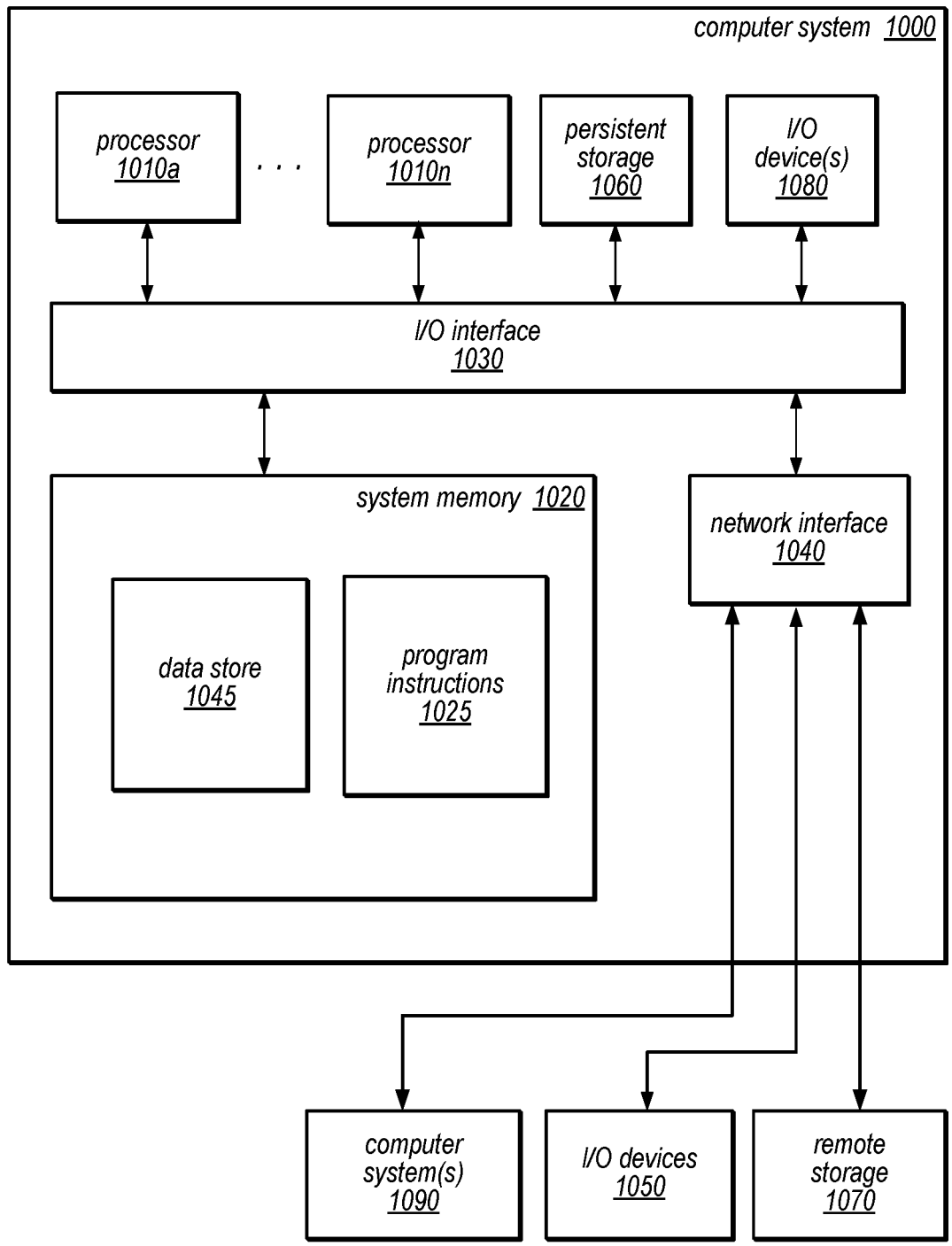
FIG. 9 is a block diagram illustrating an example computer system, according to various embodiments.

FIG. 9 is a block diagram illustrating an example computer system that may implement the techniques for creating a database clone at a specified point-in-time, according to various embodiments described herein. For example, computer system 1000 may implement a database engine head node and/or one of a plurality of storage nodes of a separate storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more nodes, respectively comprising a processor and a memory, that implement a database system, the database system configured to:
receive a request to create a clone of a database at a specified point-in-time, wherein the database system continues to accept modifications to the database requested after the receipt of the request to create the clone at a first database engine head node;
provision a second database engine head node of a second database engine of the database with access to a storage for the database, the storage accessible to the first database engine head node and the second database engine head node to create the clone of the database, wherein the storage logs modifications to the database applicable to return data of the database according to a state of the data of the database at the specified point-in-time;
receive, at the second database engine, one or more requests to modify the clone of the database; and
update, by the second database engine head node, the state of the data of the database at the specified point-in-time in the storage according to the one or more requests, wherein the updated state of the data is stored for the second database engine head node to access instead of the requested modifications to the clone of the database requested after the point-in-time.

2. The system of claim 1, wherein to provision the second database engine head node to be the clone of the database, the database system is configured to:
identify a range of the logged modifications to preserve for a clone volume to provide access to the database for the clone at the specified point-in-time; and
mount the clone volume at the second database engine head node to make the clone ready for accepting access requests to the clone of the database.

3. The system of claim 1, wherein to update the state of the data at the specified point-in-time in the storage according to the one or more requests, the database system is configured to:
cause a version of a data page that is shared with a source database volume to be created from a shared data page and one or more log records in the source database volume that describe the modifications to the database;
cause the modification to be applied to the version of the data page; and
store the modified data page as part of a clone volume for the clone.

4. The system of claim 1, wherein the database system is further configured to:
receive a request to read from the clone of the database at the second database engine head node; and
send, from the second database engine head node, a request to read a data page from a clone volume for the clone that references a data page stored for a source database volume for the database.

5. A method, comprising:
receiving, at a database system, a request to create a clone of a database at a specified point-in-time, wherein the database system continues to accept modifications to the database requested after receiving the request to create the clone;
providing, by the database system, access to a storage for the database that stores a history of modifications to the database applicable to return data of the database according to a state of the data at the specified point-in-time to create the clone of the database; and
responsive to one or more requests to modify the clone of the database, updating, by the database system, the state of the data at the specified point-in-time in the storage according to the one or more requests, wherein the updated state of the data is stored for the clone to access instead of the accepted modifications to the clone of the database requested after the point-in-time.

6. The method of claim 5, further comprising creating the clone of the database, wherein the creating comprises:
identifying a range of the history of modifications to preserve at the storage for a clone volume to provide access to the database for the clone at the specified point-in-time; and
mounting the clone volume at a database engine for the clone to make the clone ready for accepting access requests to the clone of the database.

7. The method of claim 6, further comprising:
before creating the clone of the database, determining that the specified point-in-time is within a history window for creating clones of the database.

8. The method of claim 5, further comprising:
receiving, at the database system, a request to read from the clone of the database; and
reading, by the database system, a data page from a clone volume for the clone that references a data page stored for a source database volume for the database.

9. The method of claim 5, wherein the clone is a second clone of the database, wherein a first clone of the database was created at a different specified point-in-time.

10. The method of claim 5, further comprising:
responsive to a request to delete the database, deleting the source volume of the database without deleting portions of the source database volume referenced by the clone volume.

11. The method of claim 5, wherein the updating the state of the data at the specified point-in-time in the storage comprises:
causing a version of a data page that is shared with a source database volume to be created from a shared data page and one or more log records in the source database volume that describe the modifications to the database;
causing the modification to be applied to the version of the data page; and
storing the modified data page as part of a clone volume for the clone.

12. The method of claim 11, further comprising:
receiving, by the database system, another request to modify the clone;
determining, by the database system, that the other request is another modification to the modified data page; and causing, by the database system, the other modification of the other request to be applied to the modified data page stored in the clone volume.

13. The method of claim 5, wherein the storage for the database is a distributed storage system that stores multiple different shards of the database, and wherein providing the clone of the database with access to the storage for the database provides access to the multiple different shards of the database according to the state of the data at the specified point-in-time for the clone.

14. One or more non-transitory, computer-readable storage media, storing program instructions that when executed on or across one or more computing devices cause the one or more computing devices to implement a database system that implements:
receiving a request to create a clone of a database at a specified point-in-time, wherein the database system continues to accept modifications to the database requested after receiving the request to create the clone;
providing access to a storage for the database that stores a history of modifications to the database applicable to return data of the database according to a state of the data at the specified point-in-time to create the clone of the database;
receiving one or more requests to modify the clone of the database; and
updating the state of the data at the specified point-in-time in the storage according to the one or more requests, wherein the updated state of the data is stored for the clone to access instead of the accepted modifications to the clone of the database requested after the point-in-time.

15. The one or more non-transitory, computer-readable storage media of claim 14, storing further instructions that when executed by the one or more computing devices cause the one or more computing devices to further implement:
before creating the clone of the database, determining that creating the clone does not exceed a maximum number of clones for the database.

16. The one or more non-transitory, computer-readable storage media of claim 14, wherein, in the updating the state of the data at the specified point-in-time in the storage, the program instructions cause the one or more computing devices to implement:
causing a version of a data page that is shared with a source database volume to be created from a shared data page and one or more log records in the source database volume that describe the modifications to the database;
causing the modification to be applied to the version of the data page; and
storing the modified data page as part of a clone volume for the clone.

17. The one or more non-transitory, computer-readable storage media of claim 14, storing further instructions that when executed by the one or more computing devices cause the one or more computing devices to further implement:
receiving a request to read from the clone of the database; and
reading a data page from a clone volume for the clone that references a data page stored for a source database volume for the database.

18. The one or more non-transitory, computer-readable storage media of claim 14, wherein, in creating the clone of the database, the program instructions cause the one or more computing devices to implement:
identifying a range of the history of modifications to preserve for a clone volume to provide access to the database for the clone at the specified point-in-time; and
mounting the clone volume at a database engine for the clone to make the clone ready for accepting access requests to the clone of the database.

19. The one or more non-transitory, computer-readable storage media of claim 18, storing further instructions that when executed by the one or more computing devices cause the one or more computing devices to further implement:
responsive to a request to delete the clone of the database, deleting the clone volume of the database without deleting portions of a source database volume referenced by the clone volume.

20. The one or more non-transitory, computer-readable storage media of claim 14, wherein the database system is a database service implemented as part of a provider network, wherein the storage is a storage service implemented as part of the provider network, and wherein providing the clone of the database with access to the storage comprises mounting a clone volume created in the storage service for the clone of the database.

* * * * *